Feb. 15, 1949.                R. W. STANLEY                2,461,575
                            THREAD ADVANCING REEL
Filed July 21, 1945                                    6 Sheets-Sheet 1

INVENTOR.
Richard W. Stanley
BY
Carl A. Castellan
Atty.

Feb. 15, 1949.                R. W. STANLEY                2,461,575
                          THREAD ADVANCING REEL
Filed July 21, 1945                                    6 Sheets-Sheet 3

INVENTOR.
Richard W. Stanley
BY
Carl A. Castellan
       atty.

Feb. 15, 1949.　　　R. W. STANLEY　　　2,461,575
THREAD ADVANCING REEL

Filed July 21, 1945　　　　　　　　　　　　　6 Sheets-Sheet 4

INVENTOR.
Richard W. Stanley
BY Carl A. Castellan
Atty

Feb. 15, 1949.  R. W. STANLEY  2,461,575
THREAD ADVANCING REEL

Filed July 21, 1945  6 Sheets-Sheet 5

INVENTOR.
Richard W. Stanley
BY Carl A. Castellan
Atty.

Feb. 15, 1949.   R. W. STANLEY   2,461,575
THREAD ADVANCING REEL
Filed July 21, 1945   6 Sheets-Sheet 6

INVENTOR.
Richard W. Stanley
BY Carl A. Castellan
atty

Patented Feb. 15, 1949

2,461,575

UNITED STATES PATENT OFFICE 2,461,575

THREAD ADVANCING REEL

Richard W. Stanley, Drexel Hill, Pa., assignor to American Viscose Corporation, Wilmington, Del., a corporation of Delaware Application July 21, 1945, Serial No. 606,383
In Canada July 21, 1944

15 Claims. (Cl. 28—71.6)

This invention relates to thread-advancing reels which may be used for the production of a yarn store which is continuously advanced axially of the periphery of the reel, during which time it may be subjected to fluid treatment in the manner and for the purposes conventional in the art.

This application is a continuation-in-part of copending applications Serial No. 496,543, filed July 29, 1943, now Patent 2,396,297; Serial No. 508,174, filed October 29, 1943, now Patent 2,403,031; Serial No. 560,445, filed October 26, 1944, now Patent 2,447,143; and Serial No. 594,730, filed May 19, 1945, now Patent 2,419,605.

It is a particular object of this invention to provide an improved thread-advancing reel. It is a further object of this invention to devise a reel which is adaptable to either a cantilever or double-end supported structure. It is a further object of the invention to provide a reel of this type based upon a structural principle which, when embodied in a reel of considerable axial length results in substantially uniform efficiency in thread-advancing action throughout the length of the reel, and, at the same time, is adapted to operation at high speeds of rotation of the reel.

Another object of this invention is to provide an improved arrangement for sealing operating parts to protect them from corrosive or abrasive influences, such as gases, liquids, or dirt-laden atmospheres.

Further objects and advantages of the invention will be apparent from the drawings and description thereof hereinafter.

In the drawings illustrative of the invention:

In general, the present invention is concerned with a construction of thread-advancing reel which comprises two sets of bars and means for imparting relative motion to the bars to effect advancing of the thread longitudinally of the bars and endwise of the reel. In accordance with the present invention, a sealing partition is provided between the bars with or without immediately adjoining supporting structure on the one hand and the operating mechanism on the other hand. Cooperating with the sealing partition to protect the working parts, there is provided at least one end plate arranged to substantially close off the end of the reel. Except in the case of an end plate enclosing the free end of a cantilever reel, a sealed bore is centrally disposed of the end plates to permit the projection of a driving shaft or retaining coupling member. This construction of reel is well adapted for use in operations involving the application of liquids, even of corrosive character, to threads carried in a helical path over the bars thereof. For this purpose the bars may be made of special materials, such as Durez, porcelain, Alsimag, lava, and the like, which are resistant to corrosion, have a minimum abrasive effect upon the threads being handled, and undergo substantially no deterioration in respect to their characteristic lack of abrasion during long periods of operation in corrosive conditions. Any exposed portions of the supporting structure may be made of corrosion-resistant materials regardless of their abrasive action on the threads. Such materials are much less expensive and representatives that are suitable here are Bakelite, stainless steel, Monel metal, and the like. The operating and supporting structure protected by the sealing partitions or partition and the adjacent end plate or plates can be made of a third class of materials having consideration mainly for their structural strength, frictional characteristics, and mainly disregarding the characteristics of corrosion-resistance and freedom from abrasive action on the threads. Thus, there is obtained an improved reel, at a minimum of initial cost, which has the least deteriorating effect upon the threads and has great durability even when operated under corroding conditions.

Figure 1:
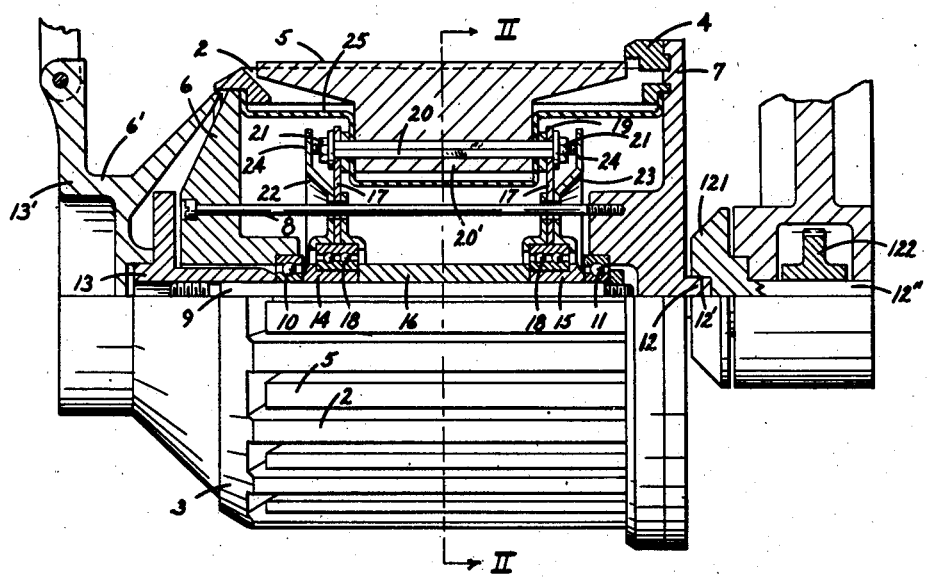
Figure 1 is a side elevation with a mid-section taken axially half-way through one embodiment of the reel of this invention.
Figure 2:
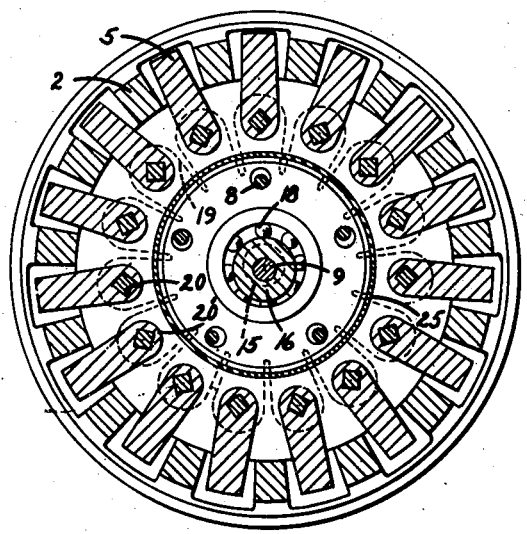
Figure 2 is a section taken on line II—II of Figure 1.

In Figures 1 and 2, the invention is shown embodied in a thread-storing, thread-advancing reel comprising a concentric set of spaced, longitudinally extending bars 2 and an eccentric set of spaced, longitudinally extending bars 5 interdigitating with and alternating between the bars of the first set. The bars in the non-concentric set are supported by a non-rigid and resiliently flexible mounting which allows axial displacement of the bars either individually or as associated groups with respect to the remaining bars in the set. This flexible mounting is preferably of such a character that displacement of the bars from a given position of rest, which may advantageously be the mean axial position of these bars during operation of the reel, is opposed resiliently by the mounting, but, during actual operation of the reel, such resilient mounting acts not only to restore the bars to their "rest" or mean position when permitted to do so, but also tends to carry the bars beyond their "rest" or mean position by virtue of their kinetic energy stored therein at the time of passage through the "rest" or mean position and imparted by the motion resulting upon release of the resilient mounting from its position of displacement from "rest" or mean position.

In Figures 1 and 2, the concentric set of longitudinally extending bar members 2 are constituted of a cylindrical cage member having a flange 4 at one end and an annular member 3 at the other end thereof and being appropriately slitted longitudinally to leave spaces alternating between the bars 2 within which the bars 5 of the other set may be actuated. The cylindrical cage may be clamped between end walls, plates or flanges 6 and 7 by suitable spaced cap screws 8. The system comprising the cylindrical cage and flanges 6 and 7 constitutes a housing which may have any axial length desired, and which may house the actuating mechanism for the other set of interdigitating bars 5. This housing is supported for rotation with respect to shaft 9 by means of suitable bearings 10 and 11. Flange 7 may be provided with a projection 12 of non-circular cross-section which is adapted to fit in a correspondingly shaped socket 12' of a coupling 121 upon the shaft 12" which may be driven by the gear 122 keyed thereto. Secured to the shaft 9 is a suitable non-circular projection 13 adapted to be received by a corresponding recess in a normally stationary but retractable supporting element 13'. Normally, shaft 9 is maintained stationary unless pitch modification is found necessary.

Two sleeves 14 and 15 are mounted upon the shaft 9 and are suitably spaced by the ring 16. The sleeves 14 and 15 have external cylindrical surfaces whose axes are askew and eccentric to the axis of shaft 9 but parallel to each other. Upon each of the sleeves, a resilient spider member 17 is mounted, preferably by means of ball bearings 18. These spiders 17 are of a resilient material, preferably of thin spring metal, and have individual radially extending members 19 between opposed pairs of which, the bars 5 are secured by suitable means, such as by two nuts 21 screwed upon the ends of the non-circular rod 20 embedded within and extending through inwardly extending portions 20' of the bars 5 and the nuts 21. Skew plates 22 and 23 are also carried by the bearings 18 and have outer flanged portions 24 which bear against the ends of the rods 20 which constitute in effect rigid extensions of the bars 5.

Where it is desired to protect the main operating parts from any possibility of clogging and corrosion when the reel is used for subjecting the filamentary material to liquids, a flexible sealing membrane 25, such as of rubber or synthetic rubber, may be secured to the outer portion of the resilient supporting means for the non-concentric bars and to the ends of the concentric cylindrical cage as shown.

As shown, the annular member 3 projects beyond the flange 6 and overhangs the outer rim of a stationary member 6', which is integral with or affixed to the support 13'. The outer peripheral surface of the member 6' preferably slopes inwardly from its outer rim to a generally cylindrical portion, which serves to hold any accumulation of thread formed after breakage of the thread being handled by the reel or during lacing up of the reel or any machine comprising the reel. Occasionally, stray filaments also tend to gather on this member 6'. The collecting member 6' has a surface of sufficient axial extent to provide adequate storage space and ready access for the operator to remove the accumulated filaments or threads at his convenience without danger of injury to his hands, and without the necessity either of stopping the reel or of giving it immediate attention when the above-mentioned emergencies arise.

In operation of the embodiment of Figures 1 and 2, the skew plate flanges 24 cause substantial axial motion of the bars 5, such motion being imparted individually to each of the bars 5 by virtue of the individual resilient projecting members 19. By virtue of the eccentricity of the resilient supporting means and the bars 5, the axial to and fro motion of the bars imparted by the skew plates is combined with a radial component of motion which alternately causes first the protrusion of the bars 5 outside the periphery of bars 2 and then their recession within that periphery, thereby resulting in the advancing of the thread axially of the reel.

While the length of the reel shown in Figures 1 and 2 is of the same order of size as its diameter, the reel may be made of any length, regardless of its diameter.

Figure 3:
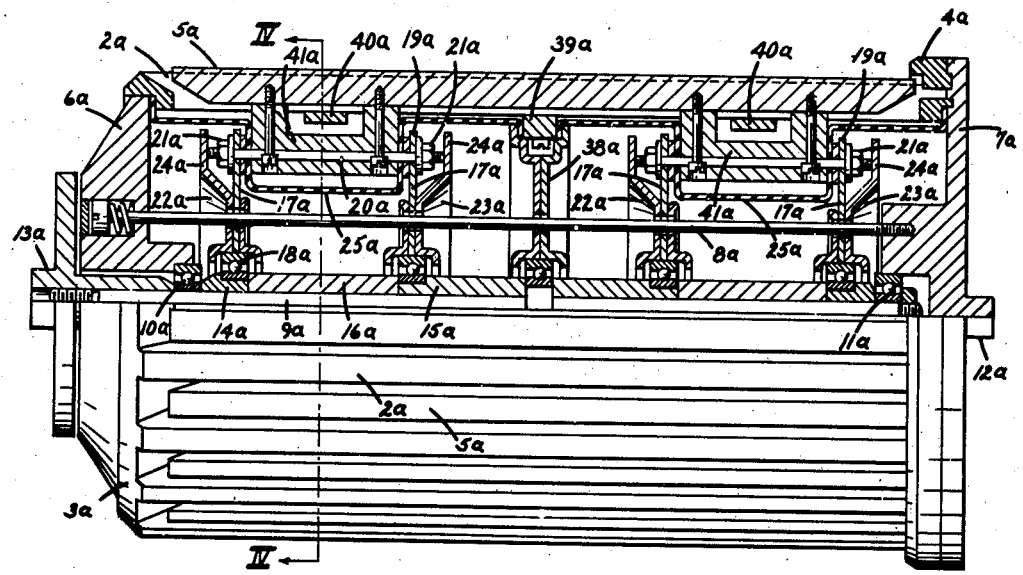
Figure 3 is a side elevation with a mid-section taken axially half-way through another embodiment of the invention.
Figure 4:
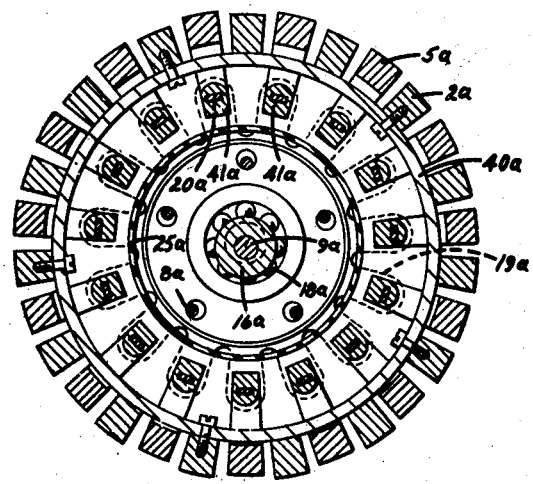
Figure 4 is a section taken on line IV—IV of Figure 3.

Figures 3 and 4 show a modification in which reference numerals with the suffix letter *a* are applied to those parts which have corresponding parts in Figures 1 and 2 designated by the corresponding numerals without the suffix. The parts correspond in function, but may not be identical in structure, as will be apparent from the description hereafter. As shown in these figures, when reels whose length is many times the size of their diameter are desired, a larger number of flexible supporting members comprising the flexible spiders 17a may be provided along the reel to obtain adequate support for the bars 5a to prevent them from sagging in the middle from the tension loads imposed by the filamentary material wound thereon. Also additional support for the cylindrical cage having bars 2a may be provided in the form of one or more rigid spiders 38a rotatably mounted upon intermediate portions of the shaft to support a corresponding annular member 39a secured to the inner periphery of the bars 2a. In addition, spaced rings 40a may be provided to stiffen the set of bars 2a in the cylindrical cage member.

Figure 5:
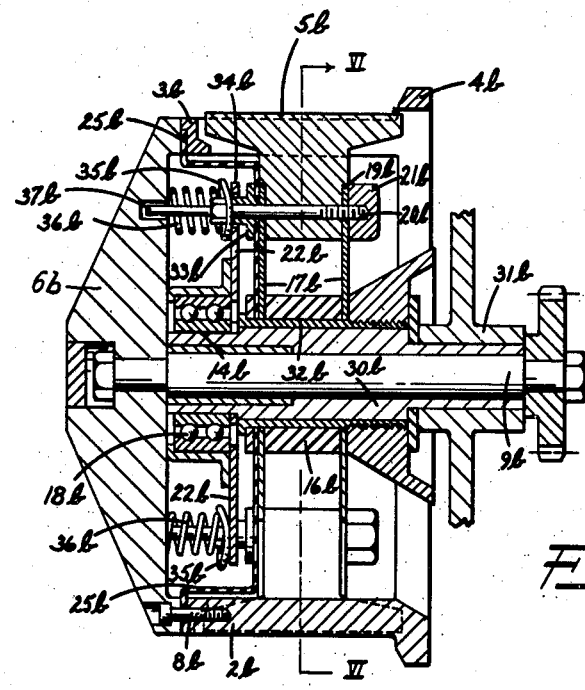
Figure 5 is a mid-section taken axially through another embodiment of the invention.
Figure 6:
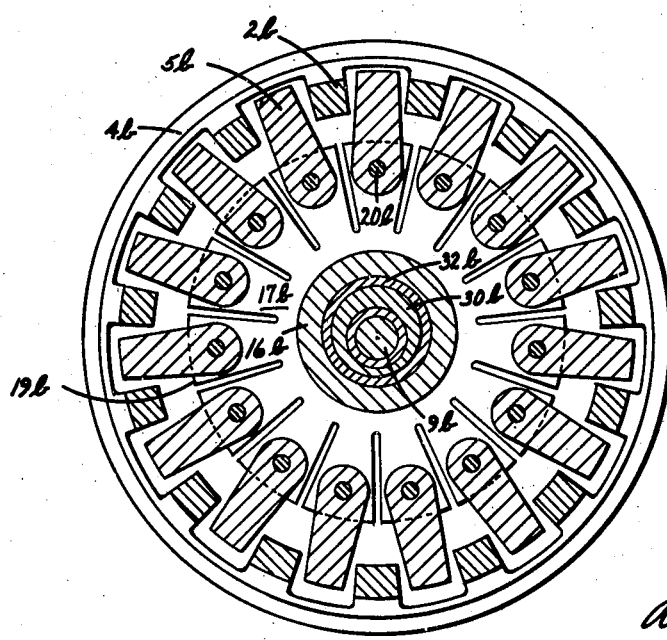
Figure 6 is a section taken on line VI—VI of Figure 5.

Referring to Figures 5 and 6, an adaptation of the reel construction of the invention to a cantilever form of reel is shown. The concentric set of bar members 2b are formed by suitably slotting radially an integral cylindrical cage member 3b having an outwardly extending flange 4b. The member 3b is secured by cap screws 8b to the supporting end wall, plate, or flange 6b whose hub is secured and keyed to the end of the shaft 9b. The shaft is mounted for rotation within a stationary sleeve 30b suitably secured within a supporting bearing 31b. The end of the sleeve 30b adjacent the hub of flange 6b has a peripheral surface 14b which is eccentric and askew with respect to the axis of shaft 9b and carries a skew plate 22b on a ball bearing 18b. A bushing 32b is carried by an adjacent peripheral surface of the sleeve 30b, which surface is eccentric but not askew with respect to the axis of shaft 9b, the amount of eccentricity being substantially the same as that of the surface 14b.

A pair of spaced flexible and resilient spiders 17b fit about the bushing and are held in proper axial relation with respect thereto by suitable washers or rings, such as 16b. The individual radially extending members 19b of the flexible spiders are secured to either side of the inwardly extending portions of the movable bar members 5b by means of the bolts 20b and nuts 21b. Upon each of the bolts 20b is mounted a collar 33b which extends through an aperture 34b in the skew plate 22b. Between each of the collars 33b and the corresponding head of the bolt, there is a washer 35b against which a spring 36b is arranged to press, a pin 37b projecting from the head of the bolt 20b serving to guide the spring and to prevent its dislocation. A flexible sealing membrane 25b is arranged to protect the working parts against the entrance of corrosive or abrasive materials.

In operation, the reel of Figures 5 and 6 is similar to the others shown, the only difference being that the springs 36b serve to assure that the bolts 20b with their bar members 5b follow the movements of the skew plate 22b.

Figure 7:
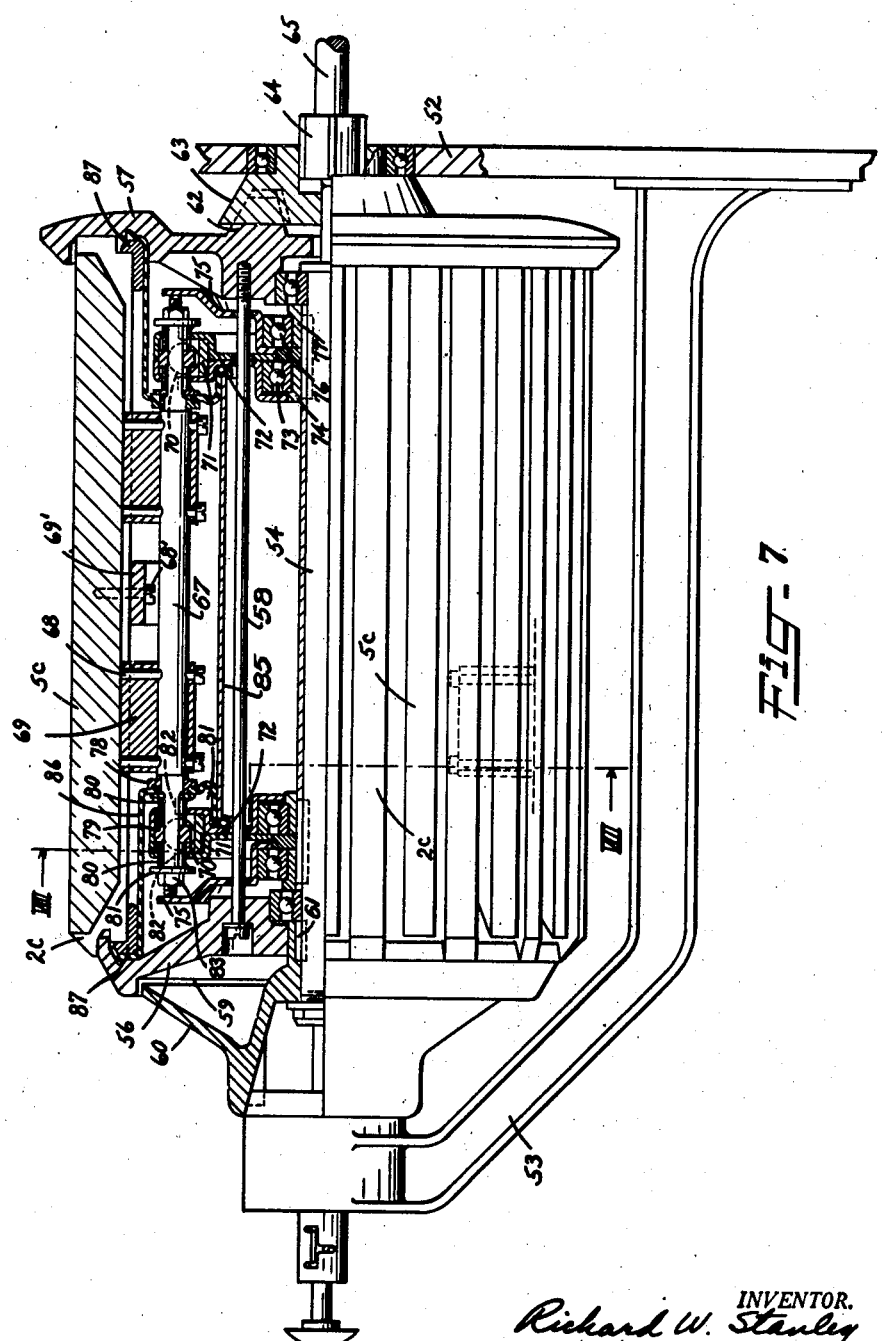
Figure 7 is a side elevation with a mid-section taken axially half-way through another embodiment of the invention taken on line VII—VII of Figure 8.
Figure 8:
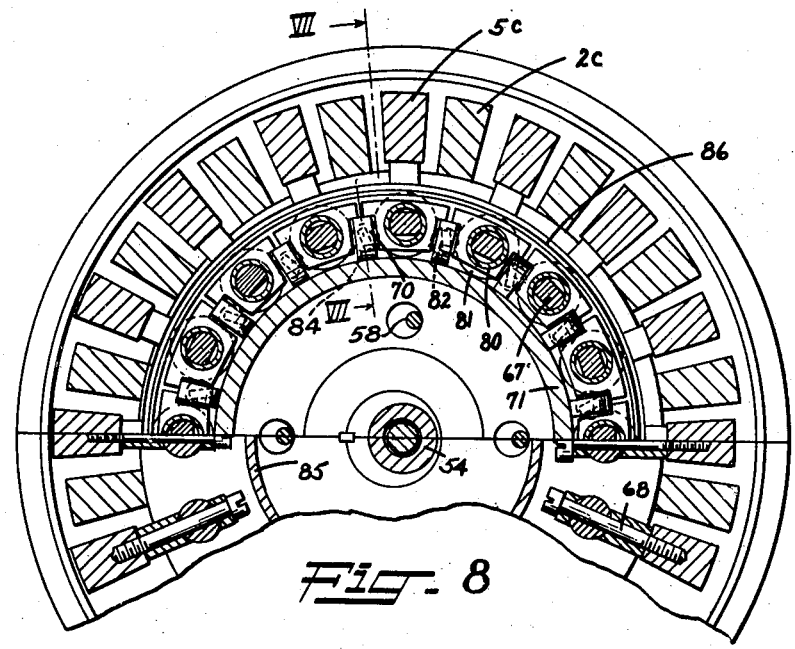
Figure 8 is a section, partially broken away, taken on line VIII—VIII of Figure 7.

In the reel construction shown in Figures 7 and 8, a supporting frame 52 and the bracket 53 extending therefrom serve to support the reel rotatably upon a shaft 54 which may be hollow as shown. The concentric set of reel bars 2c are secured between solid end walls, plates or flanges 56 and 57 of suitable structure, bolts 58 serving to tie the flanges and bars together as a cage-like unit. The flange 56 has a recess 59 in its outer face, so that a doffing ring or sleeve 60 which is keyed to the stationary shaft 54 at 61 may extend under the shoulder thereby left upon the flange. Flange 57 may be provided with coupling projections 62 adapted to fit within mating recesses in the coupling 63 mounted rotatably within the frame 52 and adapted to be driven by the splined shaft 64 secured to the shaft 65.

The actuatable bars 5c are each attached individually to rods 67 by screws 68 and braces 69. An annular reinforcing ring 69' is secured internally of the cage of bars 2c by screws 68', and extends through the space between bars 5c, rods 67 and the interconnecting braces 69 without impeding the movement of these parts during thread-advancing action. Each end of the rods 67 co-operates with roller bearings 70 arranged to roll back and forth in the direction of the axis of the reel across the width of the annular rings 71 which are supported by composite end webs 72 rotatably mounted on bearings 73 upon eccentric bushings 74, fixedly secured to the stationary shaft 54. Skew plates 75 are rotatably mounted by bearings 76 upon bushings 77 whose bearing surfaces are both eccentric and askew with respect to the axis of shaft 54. It will be noted that the annular rims of the plates 75 are in engagement with projections from the rods 67 so that during rotation of the reel the askewness of the plates 75 causes reciprocating movement of the rods 67 with bars 5c longitudinally.

The end of each rod 67 is provided with a fixed collar 78 from which a portion of the rod extending from the collar has a flattened cross section as shown at 67' in Figure 8. Upon the flattened end of the rod a bearing block 79 is positioned between two spacing sleeves 80 and two washers 81 provided with projecting lugs 82, the entire assemblage being held securely in place by the nut 83 engaging a threaded end portion of the rod. The sleeves 80 fit freely for relative movement within apertures formed in the side walls of the bearing housing formed by stamping an annular recess in the outer portion of each of the two plates forming the web 72. Additional apertures 84 are provided in the webs 72 so that the lugs 82 may enter more or less in alignment with the path of the rollers 70.

For sealing the internal bearing and driving parts a rigid cylindrical sleeve 85 of an impermeable corrosion-resistant material is clamped between the end webs 72 and flexible sealing membranes 86 of generally annular shape have their inner periphery clamped in place between the edges of the sleeve 85 and webs 72 and their outer peripheries clamped in place between the bars 2c and the flanges 56 and 57, spacing members 87 being provided to assure a tight gripping action. The flexible annuli 86 may be of rubber, synthetic rubber or any rubber substitute of impermeable corrosion-resistant character and are provided with apertures through which the rods 67 may extend. The edge of such apertures may be held tightly in place between the collars 78 and the adjacent washers 81, the outer edge of the collars 78 being bulged to assure a tight sealing action.

During operation of the embodiment of Figures 7 and 8, the cage-like assembly of bars rotates as a unit about the stationary shaft 54, the skew plates 75 causing reciprocation of the rods 67. The lugs 82 which are moved simultaneously with the rods 67 are caused to project into the path of the rollers 70 and serve to prevent such rollers from either lagging or becoming stuck in any position adjacent the end of its path of movement.

Figure 7 shows the bearing at a point intermediate the stroke of the bar or rod 67. Since the center of the roller moves only half the distance moved by the rod in a stroke, it is only necessary that a given projection 82 on the washer 81 project into the bearing housing, at the end of the stroke, a distance equal to one-half the stroke of the rod. Thus, at the end of the stroke to the right, the lugs 82 at the left in Figure 7 should extend into the housing and beyond the left web 72 a distance at least one-half the length of the stroke and conversely upon completion of the stroke to the left, the lug 82 at the right should extend a distance within the right web 72 at least one-half the length of the stroke.

Figure 9:
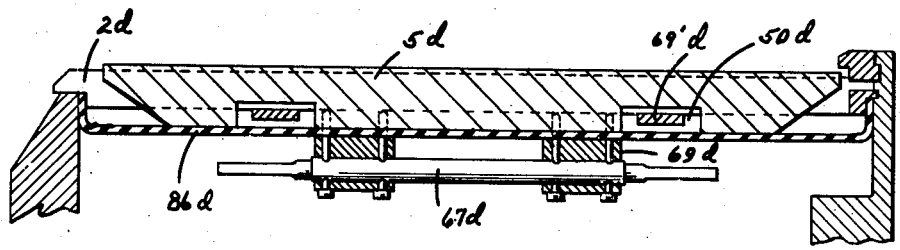
Figure 9 is a partial section taken axially showing a modification of the embodiment of Figure 7.

Figure 9 shows a modification of the bar-supporting structure of the reel of Figures 7 and 8. As shown, the actuatable bars 5d are made somewhat deeper radially of the reel as compared to the depth of bars 2d and a single flexible sealing member 86d which is substantially cylindrical extends throughout the length of the reel, being secured directly to the inwardly-facing surface of the bars 5d by means of the braces 69d which also are secured to the ends of the rods 67d. The bars 5d may be cut-out at one or more spaced intervals (two being shown) to provide apertures 50d through which the reinforcing rings 68'd for bars 2d may extend without interfering with the relative motion of the bars.

Figure 10:
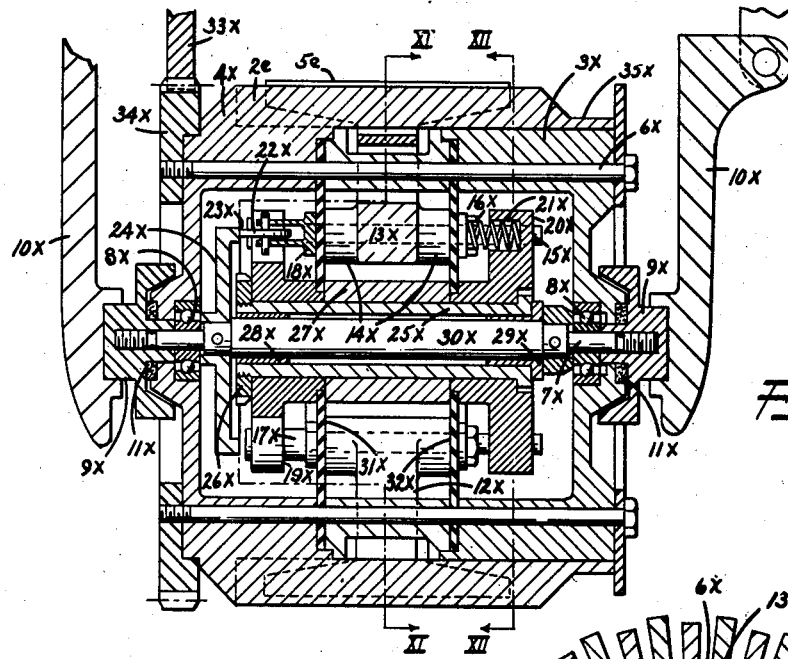
Figure 10 is a mid-section taken axially through another embodiment of the invention.
Figure 11:
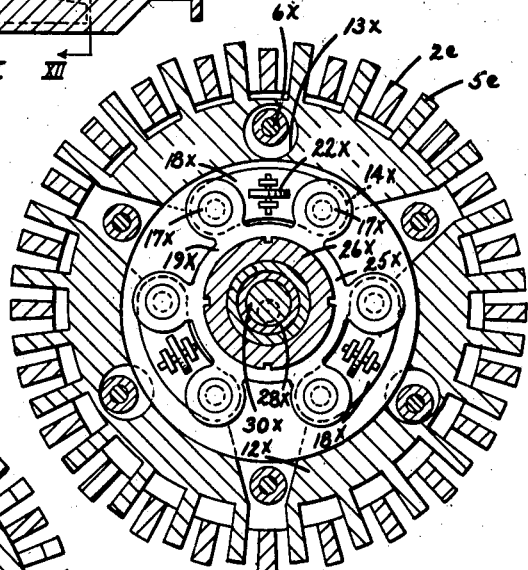
Figure 11 is a section taken on line XI—XI of Figure 10.
Figure 12:
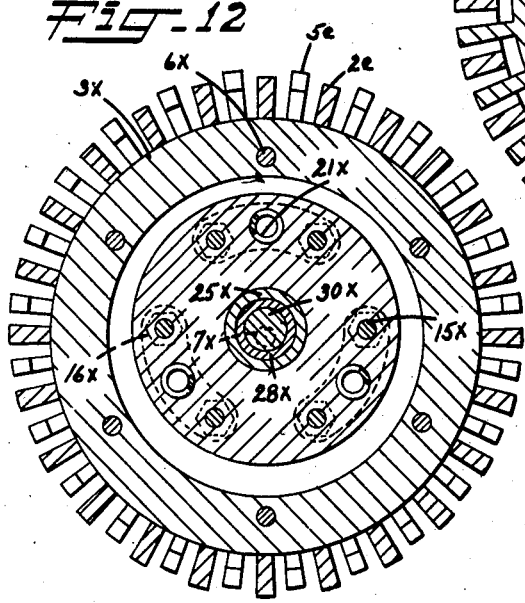
Figure 12 is a section taken on line XII—XII of Figure 10.

Referring to Figures 10 to 12, the invention is shown in a thread-advancing reel comprising two sets of interdigitating bars, the bars 2e of one set alternating with and being spaced from and between the bars 5e of the other set. One of the sets comprising bars 2e is formed by suitably slotting the periphery of a housing formed of the telescoping hollow cup-like cylindrical members 3x and 4x secured together by the bolts 6x. The bottoms of members 3x and 4x constitute end walls of the housing.

This set of bars 2e is rotatably mounted concentrically on a stationary shaft 7x by means of ball bearings 8x. The opposite ends of the shaft are provided with caps 9x suitably secured thereto, as by the screw threads shown, one being left hand and the other being right hand to prevent unscrewing during rotation of the reel. The outwardly projecting portions of the caps 9x have a non-circular periphery and are adapted to be supported in suitable supports or hangers 10x having receiving sockets with recesses of corresponding cross-section to prevent rotation. Packings 11x may be provided to prevent access of liquids to the bearings of the concentric cage or housing.

The other set of bars 5e are divided into several groups (three being shown) those of each group being formed integrally as radial projections from a casting occupying roughly a segment of a circle. Since these three units are identical, only one is described. The segment has a transverse web 12x extending in a plane substantially at right angles to the axis of the reel. The web has an opening 13x which is sufficiently large to allow plenty of clearance about the transverse bolts 6x which secure the housing or cage carrying the concentric bars 2e. As shown in Figure 10, the web 12x is provided with a pair of bosses 14x extending axially to both sides of the web. The bosses 14x have bores within which pins 15x are secured by nuts 16x. The enlarged ends 17x at the left of the pins 15x have shoulders bearing against a yoke 18x extending between the pair of bosses. The ends 17x are slidably mounted in bores through the spider 19x and the other ends of pins 15x are slidably mounted in similar bores of spider 20x. A spring 21x within a recess in spider 20x midway between the pin-receiving bores therein normally presses the entire segment assembly to the left. A roller 22x secured to the yoke 18x bears constantly against the annular cam surface 23x of the fixed cam 24x. The spiders 19x and 20x are clamped in their appropriate positions upon the sleeve 25x by nut 26x, spacer sleeve 27x of rigid, impermeable character being inserted between the spiders. The sleeve 25x is carried by bushings 28x and 29x, which in turn are carried by the centrally located eccentric portion 30x of the stationary shaft. A band 35x of member 4x beyond the bars 5e and having reduced diameter may serve as a surplus thread-collecting ring.

Flexible sealing membranes 31x and 32x may be secured to the segments, the central sleeve 27x, and the concentric cage members (as shown) where it is desired to use the reel for fluid treatment of yarns and the like, and to prevent the entrance of the fluid into the working parts of the reel.

In operation, the reel is supported in suitable supports 10x for maintaining the central shaft 7x stationary, and the concentric cage of bars 2e is driven by means of a gear 33x which meshes with gear teeth 34x formed or secured to one end of the concentric cage. The rotation of the concentric cage comprising bars 2e causes the rotation of the segment assemblies of bars 5c about the eccentric shaft 30x. As a result of the fact that bars 5c rotate about an axis which is offset from the axis of the bars 2e, the thread-carrying surfaces of bars 5e alternately project outwardly and recede inwardly from the periphery formed by bars 2e. At the same time, rotation of the segments carrying bars 5e with respect to the cam 24x causes axial motion thereof with respect to the bars 2e. The arrangement of the eccentric portion 30x of the shaft and the cam surface 23x is so selected that shortly after bars 5e are caused to project outwardly from the periphery of the bars 2e, the rise on the cam 24x shifts the bars 5e axially, which axial shift is maintained by a suitable dwell in the cam until after bars 5e have been caused to recede below the peripheral surface of bars 2e, after which a drop in the cam surface 23x permits the spring 21x to return the segment to its original positions.

The various parts of the reel may be made of any particular materials desired. The construction shown in Figures 1 to 9 lends itself readily to making the cylindrical cage members 3, (3a and 3b), the bar members 5, (5a, 5b, 5c and 5d) and bar members 2, (2a, 2b, 2c and 2d) associated therewith of materials which offer the most satisfactory bearing surface for the filamentary material to be handled thereby from the standpoint of smoothness, durability, and/or resistance to corrosion under the influence of any liquids with which the filamentary material is to be treated while being advanced longitudinally of the reel, without making the remainder of the reel thereof. This is of tremendous importance from the viewpoint of initial and depreciation cost of such reels, since materials which best meet the requirements specified are generally considerably more expensive than related materials which would be fully adequate for all portions of the supporting structure of the reel other than those intended to contact the filamentary material. In the embodiment of Figures 10 to 12, the construction is somewhat less adapted to the provision of special materials for the bars and is more expensive when it is desired to so assemble the reel. However, in any case the parts 2, 3, 4, and 5 of Figures 1 to 9 and parts 2e, 4x and 5e of Figures 10 to 12, may be made of porcelain, Durez, Alsimag, etc., while such other parts as 6 and 7 (as well as 3x in Figures 10 to 12) may be made of Bakelite, stainless steel, etc. These latter parts need not be made of materials which are entirely free of tendencies to be pitted or otherwise superficially altered by the combined action of corrosive chemicals and rubbing action of the filaments handled.

It is to be understood that changes and variations may be made without departing from the spirit and scope of the invention as defined in the appended claims.

I claim:

1. A thread-advancing reel comprising a set of spaced bars, means for rotatably mounting said set of bars comprising an end plate secured thereto at one end of the reel closing that end of the reel at which it is positioned, a second set of bars interdigitating with the bars of the first set, means for rotatably mounting the second set of bars comprising at least one supporting member extending inwardly therefrom, a shaft arranged generally centrally within the two sets of bars and extending between the end plate and the adjacent supporting member, an annular flexible sealing member connected to the second set of bars and connected to the end plate adjacent the juncture thereof with the first set of bars, and means protected within the region enclosed by the sealing member for imparting relative motion between the two sets of bars to effect advancing motion of the thread endwise of the reel.

2. A thread-advancing reel comprising a set of spaced bars, means for rotatably mounting said set of bars comprising two end plates secured to the bars adjacent their ends, thereby substantially closing the ends of the reel and forming with the bars a cage-like housing, a second set of bars interdigitating with the bars of the first set, means for rotatably mounting the second set of bars comprising at least two axially spaced supporting members extending inwardly therefrom, a shaft arranged generally centrally within the two sets of bars and extending between the end plates, sealing means extending substantially the length of the reel comprising flexible portions adjacent the ends of the reel, each connected to one of the end plates adjacent its juncture with the first set of bars and to the second set of bars, and means protected within the region enclosed by the sealing means for imparting relative motion between the two sets of bars to effect advancing motion of the thread endwise of the reel.

3. Reel mechanism comprising a set of spaced longitudinally extending bars, means for rotatably mounting said set of bars about an axis comprising two spaced supporting members substantially enclosing the space within said bars at each end thereof and thereby forming with the bars a rotatable cage-like housing, a second set of spaced, longitudinally extending bars interdigitating with those of the first set, means secured to the second set of bars and extending inwardly therefrom for supporting the second set rotatably, means for imparting relative motion between the two sets of bars to effect advancing of the thread endwise of the reel, and sealing means extending substantially the entire length of the space inside the cage-like housing for enclosing the supporting means and motion-imparting means, said sealing means having intermediate portions secured to the supporting means projecting inwardly from the second set of bars.

4. Reel mechanism comprising a set of spaced longitudinally extending bars, means for rotatably mounting said set of bars about an axis comprising two spaced supporting members substantially enclosing the space within said bars at each end thereof and thereby forming with the bars a rotatable cage-like housing, a second set of spaced, longitudinally extending bars interdigitating with those of the first set, means secured to the second set of bars and extending inwardly therefrom for supporting the second set rotatably, means for imparting relative motion between the two sets of bars to effect advancing of the thread endwise of the reel, and sealing means extending substantially the entire length of the space inside the cage-like housing for inclosing the supporting means and motion-imparting means, said sealing means having intermediate portions secured to the supporting means projecting inwardly from the second set of bars and end portions secured to the cage-like housing at the juncture of the first set of bars with the two spaced supporting members therefor.

5. A thread-advancing reel comprising a rotatably mounted housing having substantially closed end walls and a plurality of peripherally disposed bars extending between the walls, a second set of bars alternating with said plurality of bars, supporting means for the second set of bars rotatably mounted within the housing comprising axially spaced members and longitudinal members extending between the axially spaced members, a sleeve disposed inwardly of the longitudinal members and between the axially spaced members, a pair of annular, flexible sealing members each having its inner periphery secured between one of the axially spaced members and the adjacent end of the sleeve and extending outwardly to a position of sealing engagement with the internal periphery of the housing and having intermediate openings through which the longitudinal members of the supporting means for the second set of bars extend in sealing engagement, and means within the region of the housing enclosed by the sealing members and sleeve for imparting relative motion to the supporting means for the second set of bars to effect thread-advancing motion endwise of the reel.

6. A thread-advancing reel comprising a rotatably mounted housing having substantially closed end walls and a plurality of peripherally disposed bars extending between the walls, a second set of bars alternating with said plurality of bars, supporting means for the second set of bars rotatably mounted within the housing comprising axially spaced members and longitudinal members extending between the axially spaced members, a sleeve disposed inwardly of the longitudinal members and between the axially spaced members, a pair of annular flexible sealing members each having its inner periphery secured between one of the axially spaced members and the adjacent end of the sleeve and extending outwardly to a position of sealing engagement with the internal periphery of the housing and having intermediate openings through which the longitudinal members of the supporting means for the second set of bars extend in sealing engagement, and means comprising an eccentric within the sleeve and a cam within the region of the housing enclosed between one of the end walls and the nearer of the sealing members for imparting relative motion to the supporting means for the second set of bars to effect thread-advancing motion endwise of the reel.

7. A thread-advancing reel comprising a rotatably mounted housing having substantially closed end walls and a plurality of peripherally disposed bars extending between the walls, a second set of bars alternating with said plurality of bars, supporting means for the second set of bars rotatably mounted within the housing comprising axially spaced members and longitudinal members extending between the axially spaced members, a sleeve disposed inwardly of the longitudinal members and between the axially spaced members, a pair of annular flexible sealing members each having its inner periphery secured between one of the axially spaced members and the adjacent end of the sleeve and extending outwardly to a position of sealing engagement with the internal periphery of the housing and having intermediate openings through which the longitudinal members of the supporting means for the second set of bars extend in sealing engagement, an eccentric within the sleeve upon which is mounted the axially spaced members of the supporting means for the second set of bars, a cam mounted in the housing in fixed relationship to the eccentric, and cam follower means on the longitudinal members of the supporting means for the second set of bars, said cam and follower means being arranged to be protected by the flexible sealing means.

8. Reel mechanism comprising two sets of spaced, longitudinally extending bars rotatable as a unit, the bars of one set alternating with those of the other, supporting means for one set of the bars comprising cup-like cylindrical members having their annular flanges extending inwardly therefrom adjacent the ends of the bars substantially enclosing the regions within the end portions of the bars, supporting means for the second set of bars comprising axially spaced members positioned within the regions surrounded by the cup-like members and longitudinal members extending between the axially spaced member and longitudinally reciprocable with respect thereto, a sleeve between the axially spaced members, means within the cup-like members for imparting relative motion between the two sets of bars to effect thread-advancing motion endwise of the reel, and radially extending flexible sealing partitions having their inner peripheries secured between the sleeve and the axially spaced members, their intermediate portions connected in sealing engagement with the longitudinal members, and their outer peripheries secured to the cup-like members.

9. A thread-advancing reel comprising rotatably mounted end plates, a rotatable supporting means between the plates having two axially spaced bearings and a rigid, impermeable sleeve secured therebetween, a pair of flexible, impermeable sealing members of generally annular shape each secured to one plate and to the adjacent end of the rigid sleeve and arranged to surround the corresponding bearings, a plurality of reciprocable bars outside the flexible members, bearing means for the bars carried by connecting parts extending through tightly sealed apertures in the flexible members, and means within the space surrounded by the rigid sleeve and flexible sealing members for reciprocating the bars.

10. A thread-advancing reel comprising two axially spaced rotatably mounted end flanges, a rotatable supporting means between the plates having two axially spaced generally annular housings and a rigid, impermeable sleeve secured therebetween, an annular bearing in each housing, a plurality of reciprocable thread-carrying bars, bearing means for the bars projecting through the housings and being relatively movable axially with respect thereto, rollers arranged between the annular bearing and in rolling contact with the annular bearing and the bar bearing means for rolling movement generally axially of the reel, means for reciprocating the bars, said annular housings comprising a pair of flexible impermeable sealing members of generally annular shape having tightly sealed apertures through which extend the projecting bearing means of the bars, said sealing members having their inner peripheries secured adjacent the corresponding end of the sleeve and their outer peripheries secured to the end flanges thereby protecting the bearings and operating parts from entrance of dust and treating materials to which the thread carried by the reel is subjected while preventing lubricants for the bearings within the sealing means from traveling to the thread and the thread-carrying surfaces of the bars.

11. Reel mechanism comprising a set of spaced longitudinally extending bars, means for rotatably mounting said set of bars about an axis comprising two spaced supporting members substantially enclosing the space within said bars at each end thereof and thereby forming with the bars a rotatable cage-like housing, a second set of spaced, longitudinally extending bars interdigitating with those of the first set, means secured to the second set of bars and extending inwardly therefrom for supporting the second set rotatably, means for imparting relative motion between the two sets of bars to effect advancing of the thread endwise of the reel, and sealing means extending substantially the entire length of the space inside the cage-like housing for enclosing the motion-imparting means, said sealing means comprising a flexible, substantially cylindrical member secured directly to the inwardly facing surfaces of the bars of one set and having apertures in intermediate portions thereof, said inwardly extending supporting means projecting radially through, and being in sealing engagement with, said apertures.

12. Reel mechanism comprising a set of spaced longitudinally extending bars, means for rotatably mounting said set of bars about an axis comprising two spaced supporting members substantially enclosing the space within said bars at each end thereof and thereby forming with the bars a rotatable cage-like housing, a second set of spaced, longitudinally extending bars interdigitating with those of the first set, means secured to the second set of bars and extending inwardly therefrom for supporting the second set rotatably, means for imparting relative motion between the two sets of bars to effect advancing of the thread endwise of the reel, and sealing means extending substantially the entire length of the space inside the cage-like housing for enclosing the motion-imparting means, said sealing means being secured directly to the surfaces of the bars of one set.

13. A reel in accordance with claim 12 in which the sealing means comprises a flexible, substantially cylindrical member.

14. Reel mechanism comprising a set of spaced longitudinally extending bars, means for rotatably mounting said set of bars about an axis comprising two spaced supporting members substantially enclosing the space within said bars at each end thereof and thereby forming with the bars a rotatable cage-like housing, a second set of spaced, longitudinally extending bars interdigitating with those of the first set and having a greater depth extending radially of the reel than the bars of the first set, means secured to the second set of bars and extending inwardly therefrom for supporting the second set rotatably, means for actuating the second set of bars to effect advancing of the thread endwise of the reel, and sealing means extending substantially the entire length of the space inside the cage-like housing for enclosing the motion-imparting means, said sealing means comprising a flexible, substantially cylindrical member secured directly to the inwardly facing surfaces of the actuated bars.

15. The reel of claim 14 in which the bars of both sets are rigid.

RICHARD W. STANLEY.

REFERENCES CITED

The following references are of record in the file of this patent:

UNITED STATES PATENTS

| Number | Name | Date |
|---|---|---|
| 2,056,197 | Knebusch | Oct. 6, 1936 |
| 2,181,916 | Samerdyke | Dec. 5, 1939 |
| 2,217,716 | Torrence et al. | Oct. 15, 1940 |
| 2,403,031 | Stanley et al. | July 2, 1946 |